US010836316B2

United States Patent
Asang

(10) Patent No.: US 10,836,316 B2
(45) Date of Patent: Nov. 17, 2020

(54) INTERIOR MIRROR BASE ARRANGEMENT FOR A MOTOR VEHICLE

(71) Applicant: Bayerische Motoren Werke Aktiengesellschaft, Munich (DE)

(72) Inventor: Peter Asang, Eurasburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 170 days.

(21) Appl. No.: 15/910,560

(22) Filed: Mar. 2, 2018

(65) Prior Publication Data

US 2018/0186291 A1    Jul. 5, 2018

Related U.S. Application Data

(63) Continuation of application No. PCT/EP2016/069424, filed on Aug. 16, 2016.

(30) Foreign Application Priority Data

Sep. 4, 2015 (DE) .................. 10 2015 216 999

(51) Int. Cl.
   *B60R 1/04* (2006.01)
   *B60R 1/12* (2006.01)
   *B60R 11/00* (2006.01)

(52) U.S. Cl.
   CPC ........ *B60R 1/04* (2013.01); *B60R 2001/1223* (2013.01); *B60R 2001/1253* (2013.01); *B60R 2011/005* (2013.01); *B60R 2011/0033* (2013.01)

(58) Field of Classification Search
   CPC ................. B60R 1/04; B60R 2011/005; B60R 2011/0033; B60R 2001/1253; B60R 2001/1223
   See application file for complete search history.

(56) References Cited

U.S. PATENT DOCUMENTS

| | | | |
|---|---|---|---|
| 2007/0091626 A1* | 4/2007 | Hook ........................ | B60R 1/04 362/494 |
| 2013/0214548 A1 | 8/2013 | Harders et al. | |
| 2013/0229522 A1 | 9/2013 | Schofield et al. | |

FOREIGN PATENT DOCUMENTS

| | | |
|---|---|---|
| CN | 2933166 Y | 8/2007 |
| CN | 101638044 A | 2/2010 |
| CN | 202029754 U | 11/2011 |
| CN | 202106914 U | 1/2012 |
| CN | 202174992 U | 3/2012 |
| CN | 203142526 U | 8/2013 |
| DE | 31 17 824 A1 | 11/1982 |
| DE | 195 30 617 A1 | 2/1997 |

(Continued)

OTHER PUBLICATIONS

German Search Report issued in counterpart German Application No. 10 2015 216 999.5 dated Jun. 17, 2016 with partial English-language translation (Fifteen (15) pages).

(Continued)

*Primary Examiner* — Robert E. Tallman
(74) *Attorney, Agent, or Firm* — Crowell & Moring LLP

(57) ABSTRACT

An interior mirror base arrangement for a motor vehicle has a base for an interior mirror which can be permanently fastened to a windshield of the motor vehicle adjacent to a roof liner, a cover element which is movably mounted on the base, and a fastener, by which the cover element can be fastened to the roof liner.

13 Claims, 2 Drawing Sheets

(56) References Cited

FOREIGN PATENT DOCUMENTS

DE    10 2006 009 318 A1    9/2007
DE    10 2011 108 392 A1    3/2012
GB         2 099 069 A     12/1982

OTHER PUBLICATIONS

International Search Report (PCT/ISA/210) issued in PCT Application No. PCT/EP2016/069424 dated Oct. 12, 2016 with English-language translation (Five (5) pages).
German-language Written Opinion (PCT/ISA/237) issued in PCT Application No. PCT/EP2016/069424 dated Oct. 12, 2016 (Five (5) pages).
Chinese Office Action issued in Chinese application No. 201680050526.8 dated Mar. 25, 2020 (Eight (8) pages).

* cited by examiner

INTERIOR MIRROR BASE ARRANGEMENT FOR A MOTOR VEHICLE

CROSS REFERENCE TO RELATED APPLICATIONS

This application is a continuation of PCT International Application No. PCT/EP2016/069424, filed Aug. 16, 2016, which claims priority under 35 U.S.C. § 119 from German Patent Application No. 10 2015 216 999.5, filed Sep. 4, 2015, the entire disclosures of which are herein expressly incorporated by reference.

BACKGROUND AND SUMMARY OF THE INVENTION

The present invention relates to an interior mirror base arrangement for a motor vehicle, having a base for an interior mirror which can be permanently fastened to a windshield of the motor vehicle adjacent to a roof cladding.

DE 102006009318 A1 discloses a holding device for an interior mirror of a vehicle. The holding device is adhesively bonded to an inner side of a windshield of the motor vehicle. Furthermore, an optical sensor is fastened to the holding device and makes it possible to determine a distance, a speed and a direction of an object approaching the vehicle. The holding device further has a fastening for the interior mirror. Moreover, there is provided a multipart covering which bears against the windshield in a form-fitting manner.

The problem arises that if the covering is designed to adjoin a roof liner, a gap between the covering and the roof liner is visible and, by virtue of the dimensional tolerances of a roof liner, or of the front window which is fixedly connected to a vehicle body, this gap can appear with a greater or lesser size and can detract from a high-grade appearance of this region.

It is therefore the object of the present invention to provide an interior mirror base arrangement for a motor vehicle in which a gap between an interior mirror base and a roof cladding that is visible to a vehicle occupant is reliably reduced.

This and other objects are achieved by an interior mirror base arrangement for a motor vehicle having a base for an interior mirror which can be permanently fastened to a windshield of the motor vehicle adjacent to a roof cladding, a cover element which is movably mounted on the base, and a fastener by which the cover element can be fastened to the roof cladding.

Fastening the cover element to the roof cladding makes it possible to minimize a gap between the cover element and the roof cladding, or at least ensures the size of a predetermined gap. Furthermore, the movable mounting of the cover element allows a situation in which the cover element can be arranged so as to adjoin the roof liner independently of a position of the base on the front window or independently of a relative position of the roof cladding, vehicle body, front window and base.

The motor vehicle can be a passenger motor vehicle. The term roof cladding can also be interchangeably used with the term roof liner.

According to a preferred embodiment of the interior mirror base arrangement, an end portion, which is situated opposite the roof cladding, of the cover element and the fastener are designed such that the cover element is in contact with the roof cladding substantially without a gap visible to a vehicle occupant. In particular, an outer contour of the roof cladding and an outer contour of the cover element are designed to match one another. The term "vehicle occupants" means, in particular, persons sitting on a front seat row and from whose angle of view no gap should be visible, with the result that the interior mirror base arrangement presents a high-grade appearance.

According to a further preferred aspect of the interior mirror base arrangement according to the invention, the fastener has at least one latching element by which the cover element and the roof cladding can be latched with one another.

A latching element is particularly advantageous during a mounting operation and can ensure a durable connection between the cover element and the roof cladding.

A plurality of latching elements as fasteners can also be used.

With particular preference, the fastener is adapted to elastically prestress the cover element against the roof cladding.

It is thereby ensured in a particularly simple manner that the cover element and the roof cladding remain in contact with one another and no visible gap occurs. In this regard, a spring element can be used as a fastener. It is equally possible for a spring element and latching element to be combined with one another as the fastener.

The cover element is preferably displaceable in the vehicle longitudinal direction. Furthermore, the cover element is preferably displaceable in a vehicle vertical direction. The cover element can equally be mounted in such a way that it is displaceable in a vehicle longitudinal direction and a vehicle vertical direction such that it is resultingly also displaceable in all directions between a vehicle longitudinal direction and a vehicle vertical direction.

In addition or alternatively, the cover element can be mounted on the base so as to be pivotable about a pivot axis which extends parallel to a vehicle transverse direction. The pivot axis can be an actual, i.e. physical, or a virtual pivot axis.

The above-described displaceable or pivotable mounting allows dimensional tolerances of the vehicle roof liner or of the vehicle body and of the front window to be compensated for in a particularly effective manner since a region in which the roof liner and the cover element adjoin one another extends substantially in the vehicle transverse direction.

According to a further preferred development of the present invention, the mounting of the cover element on the base is formed by way of at least one receiving shoe which is formed either on the cover element or on the base and in which an insertion portion of the respective other element from the cover element and the base is movably received.

Here, the receiving shoe is preferably arranged on an opposite side of the cover element from the roof cladding.

The receiving shoe and the insertion portion make it possible for a displaceable and/or pivotable mounting of the cover element to be realized in a particularly simple manner.

Here, the receiving shoe preferably has an elastic leg which is elastically prestressed against the insertion portion.

The elastic stressing of the leg means that the cover element can be mounted fixedly or without play on the base, with the result that a movement of the cover element after fastening to the roof cladding is prevented and rattling noises or the like are avoided.

The base preferably has a base surround which is connected rigidly, that is to say fixedly or immovably, to the base or which is formed integrally with the base, wherein the movably mounted cover element and the base surround overlap one another and are formed in a complementary manner to one another, in particular in the overlapping region.

In other words, the cover element and the base surround are designed as shells which match one another and which are displaceable with respect to one another in accordance with the predetermined freedom of movement of the cover element.

According to a preferred development of the interior mirror base arrangement with the base surround, the cover element and the base surround are formed in a complementary manner to one another and overlap one another in such a way that, in different positions of the movably mounted cover element, substantially no gap between the cover element and the base surround is visible to a vehicle occupant. This does not mean that no gap is present between the cover element and the base surround, but, at least, the cover element and base surround are designed in such a way that the gap is not visible from the angle of view of a vehicle occupant.

According to a preferred development of the interior mirror base arrangement, at least one electronic device is arranged under or behind the cover element. The electronic device can comprise, for example, an optical sensor system, for example a camera.

Other objects, advantages and novel features of the present invention will become apparent from the following detailed description of one or more preferred embodiments when considered in conjunction with the accompanying drawings.

There follows a detailed description of an exemplary embodiment of the present invention with reference to FIGS. 1 to 4.

DETAILED DESCRIPTION OF THE DRAWINGS

Figure 1:
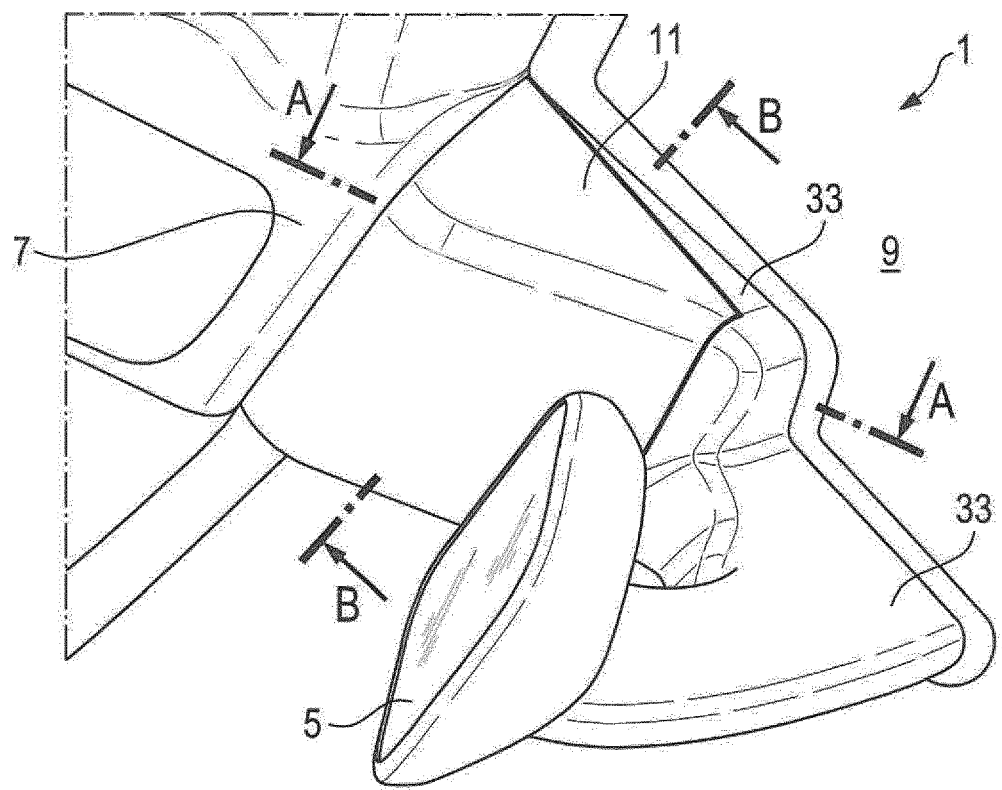
FIG. 1 is a schematic perspective view of an interior mirror base arrangement according to an exemplary embodiment of the present invention.

As shown in FIG. 1, an interior mirror base arrangement 1 according to the exemplary embodiment of the present invention has a base 3 on which an interior mirror 5 is mounted in an articulated manner. The base 3 is permanently fixed to a front window (windshield) 9 of the motor vehicle, i.e. adhesively bonded thereto, adjacent to a roof cladding 7. The base 3 can also be of multipart form with a first element which is fixed to the front window 9 and a further element which is fastened to the first element and is formed as a housing. Furthermore, the interior mirror base arrangement 1 has a cover element 11 which is mounted on the base 3 and adjoins the roof cladding 7, in particular a front end portion of the roof cladding 7. Both the roof cladding 7 and the front window 9 are fastened to a body of the motor vehicle. The roof cladding 7 can have a multipart, sandwich-like construction, for example with a roof liner element which is visible from the passenger compartment and composed of a textile material, a base element and a carrier frame. The end portion of the roof cladding 7 is visible from the passenger compartment and formed in the region of an upper portion of the front window 9.

Figure 2:
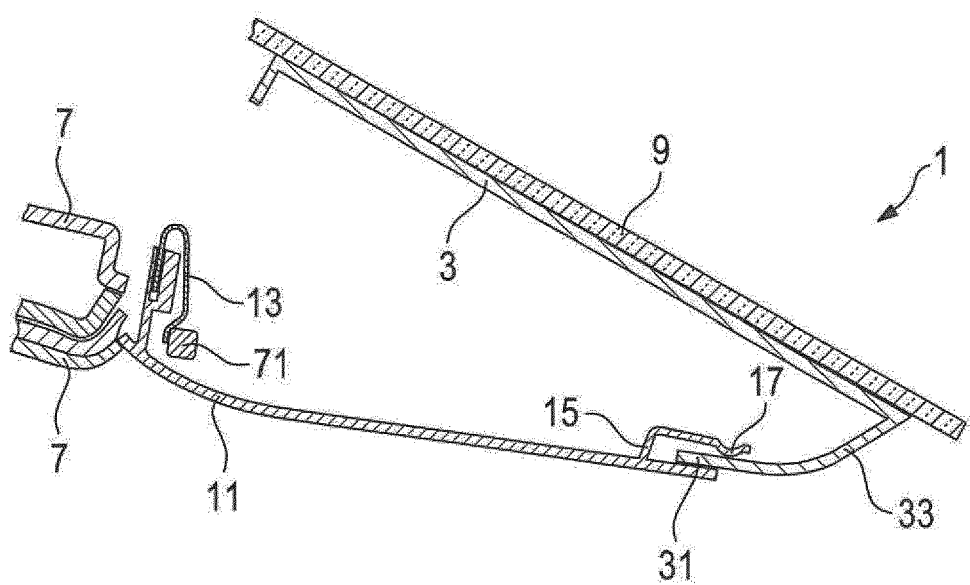
FIG. 2 is a schematic sectional view of the interior mirror base arrangement according to the exemplary embodiment of the present invention along a plane A-A in the vehicle longitudinal direction.
Figure 3:
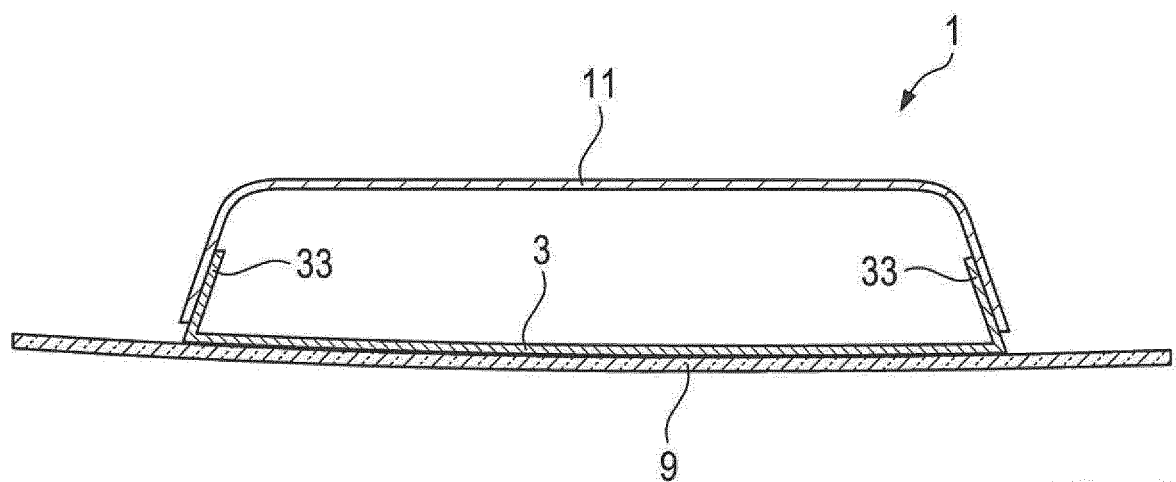
FIG. 3 is a schematic sectional view of the interior mirror base arrangement according to the exemplary embodiment of the present invention along a plane B-B in the vehicle transverse direction.
Figure 4:
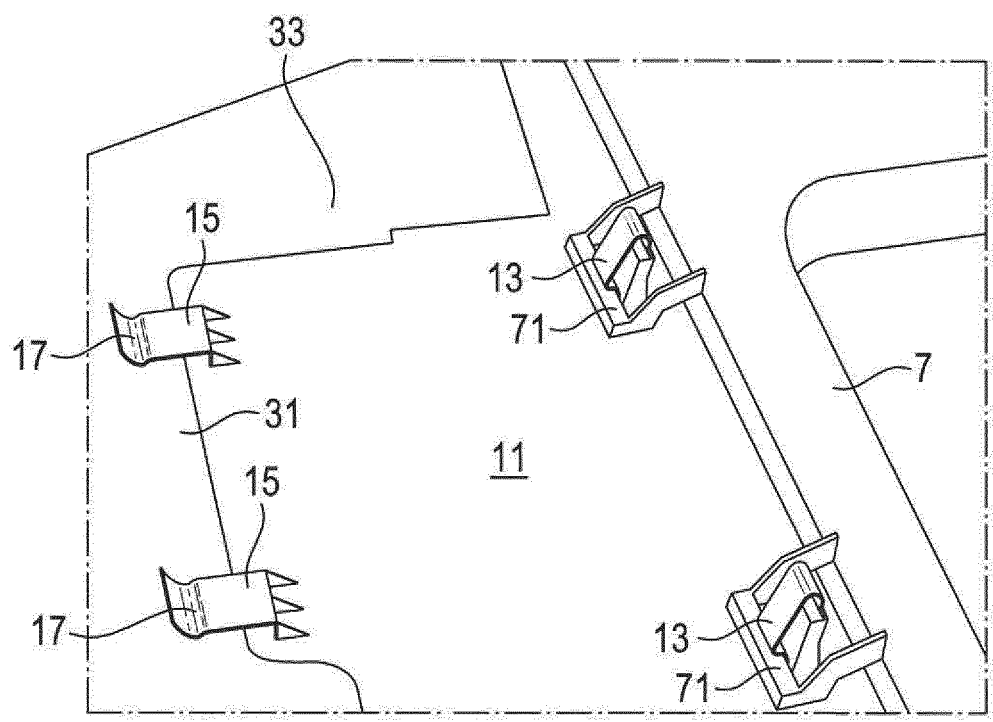
FIG. 4 is a schematic perspective view of an underside of a cover element of the interior mirror base arrangement according to the exemplary embodiment of the present invention.

A mounting and fastening of the cover element 11 can be more clearly seen in the sectional views shown in FIGS. 2 and 3 and the perspective view shown in FIG. 4. As is shown in FIG. 2, the cover element 11 is latched with the roof cladding 7 by way of a spring clip 13 and elastically prestressed against the roof cladding 7. The spring clip 13 is fastened in a spring base of the cover element 11. A free end of the spring clip 13 engages in a lug 71 which is formed on a frame element of the cover element 11 and, as a result, presses the cover element 11 against the end portion of the roof cladding 7. Here, a rear end portion of the cover element 11 adjoins the front end portion of the roof cladding 7 in a form-fitting manner, i.e. substantially gap-free. The outer contour of the roof cladding 7 and of the cover element 11 are accordingly adapted to one another. Here, in particular, no visible gap between the roof cladding 7 and the cover element 11 is discernible to a vehicle occupant from the passenger compartment. Furthermore, the cover element 11 is movably connected to the base 3, i.e. in particular to a base surround 33 of the base 3, via a receiving shoe 15 formed integrally with the cover element 11. The base surround 33 forms an outer wall of the base 3 that adjoins the front window 9. The receiving shoe 15 of the cover element 11 is pushed over an edge portion 31 of the base surround 33. The receiving shoe 15 has an elastic leg 17, with the result that the edge portion 31 of the base surround 33 is mounted in a play-free manner in the receiving shoe 15. By virtue of the receiving shoe 15, the cover element 11 is displaceably and also pivotably mounted with respect to the base surround 33 within certain predetermined limits. As a result, it is possible to compensate for manufacturing-related tolerances between the roof cladding 7, the vehicle body and the front window 9. The receiving shoe 15 is formed on an opposite end of the cover element 11 from the roof cladding 7. A plurality of receiving shoes 15 can also be provided on the cover element 11, as is shown in FIG. 4.

In the vehicle transverse direction, corresponding mutually complementary portions of the base surround 33 and of the cover element 11 overlap, as is shown in FIG. 3. In particular, the cover element 11 overlaps the base surround 33, with the result that a gap which may possibly be present between the base surround 33 and the cover element 11 is not visible from the view of the vehicle occupant.

Overall, an interior mirror arrangement, which is independent of tight manufacturing tolerances, is made possible by the inner mirror base arrangement 1 according to the invention with the cover element 11 fastened to the roof cladding 7 and with the movable mounting of the cover element 11 on the base 3 or on the base surround 33, wherein the portion between the cover element 11 and the adjoining roof liner 7 is formed substantially without a visible gap.

Various electronic devices can be arranged under the base surround 33 or under the cover element 11, such as, for example, an optical sensor system, for detecting rain, light and further parameters necessary for driver assist systems. In particular, the sensor system can include a camera.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An interior mirror base arrangement for a motor vehicle, comprising:
 a base for an interior mirror, the base being permanently fixable to a front window of the motor vehicle adjacent to a roof cladding;
 a cover element which is movably mounted on the base; and
 a fastener by which the cover element is fastenable to the roof cladding;
 wherein the cover element is displaceable in a vehicle longitudinal direction, in a vehicle vertical direction, and/or mounted on the base so as to be pivotable about a pivot axis which extends parallel to a vehicle transverse direction.

2. The interior mirror base arrangement as claimed in claim 1, wherein
 an end portion, which is situated opposite the roof cladding, of the cover element and the fastener are configured such that the cover element is in contact with the roof cladding substantially without a gap visible to a vehicle occupant.

3. The interior mirror base arrangement as claimed in claim 2, wherein
 the fastener comprises at least one latching element by which the cover element and the roof cladding are latchable with one another.

4. The interior mirror base arrangement as claimed in claim 1, wherein
 the fastener comprises at least one latching element by which the cover element and the roof cladding are latchable with one another.

5. The interior mirror base arrangement as claimed in claim 1, wherein
 the fastener is adapted to elastically prestress the cover element against the roof cladding.

6. The interior mirror base arrangement as claimed in claim 3, wherein
 the fastener is adapted to elastically prestress the cover element against the roof cladding.

7. The interior mirror base arrangement as claimed in claim 1, wherein
 the mounting of the cover element on the base is formed by at least one receiving shoe formed either on the cover element or on the base and in which an insertion portion of the associated other element of the cover element and the base is movably received.

8. The interior mirror base arrangement as claimed in claim 7, wherein
 the receiving shoe has an elastic leg which is elastically prestressed against the insertion portion.

9. The interior mirror base arrangement as claimed in claim 1, wherein
 the base has a base surround which is connected rigidly to the base or formed integrally with the base, and
 the movably mounted cover element and the base surround overlap one another and are formed in a complementary manner to one another at least in an overlapping region.

10. The interior mirror base arrangement as claimed in claim 9, wherein
 the cover element and the base surround are formed in a complementary manner to one another and overlap one another such that, in different positions of the movably mounted cover element, substantially no gap between the cover element and the base surround is visible to a vehicle occupant.

11. The interior mirror base arrangement as claimed in claim 1, wherein
 at least one electronic device is arranged under the cover element.

12. The interior mirror base arrangement as claimed in claim 11, wherein the device is a sensor system.

13. The interior mirror base arrangement as claimed in claim 1, wherein the vehicle is a passenger motor vehicle.

* * * * *